United States Patent [19]

Bauer et al.

[11] Patent Number: 5,676,112
[45] Date of Patent: Oct. 14, 1997

[54] METHOD AND ARRANGEMENT FOR CONTROLLING AN INTERNAL COMBUSTION ENGINE

[75] Inventors: Bernhard Bauer, Friolzheim; Heinz Stutzenberger, Vaihingen; Klaus Böttcher, Oberriexingen, all of Germany

[73] Assignee: Robert Bosch GmbH, Stuttgart, Germany

[21] Appl. No.: 540,170

[22] Filed: Oct. 6, 1995

[30] Foreign Application Priority Data

Oct. 6, 1994 [DE] Germany ............... 44 35 741.9

[51] Int. Cl.[6] .................... B60K 28/16; F02D 43/00
[52] U.S. Cl. ................... 123/333; 123/348; 123/350; 180/197
[58] Field of Search ..................... 123/345–348, 123/321, 322, 396, 90.15–90.18, 184.51, 184.55, 184.56, 481, 198 F, 323, 333, 350; 180/197; 364/426.03; 60/324, 312

[56] References Cited

U.S. PATENT DOCUMENTS

| | | | |
|---|---|---|---|
| 4,856,465 | 8/1989 | Denz et al. | 123/90.17 |
| 4,892,071 | 1/1990 | Asayama | 123/396 |
| 5,000,280 | 3/1991 | Wazaki et al. | 180/197 |
| 5,042,436 | 8/1991 | Yamamoto et al. | 123/90.16 |
| 5,046,461 | 9/1991 | Kanehiro et al. | 123/90.15 |
| 5,365,441 | 11/1994 | Ander et al. | 123/481 |
| 5,369,586 | 11/1994 | Bridgens | 123/481 |
| 5,459,662 | 10/1995 | Tezuka et al. | 123/481 |
| 5,479,898 | 1/1996 | Cullen et al. | 123/350 |

FOREIGN PATENT DOCUMENTS

| | | |
|---|---|---|
| 0545535 | 6/1992 | European Pat. Off. . |
| 3608310 | 9/1987 | Germany . |

Primary Examiner—Andrew M. Dolinar
Attorney, Agent, or Firm—Walter Ottesen

[57] ABSTRACT

The invention is directed to a method and an arrangement for controlling an internal combustion engine wherein a torque reducing control of the opening times of the inlet and outlet valves of the engine and/or a torque reducing control of the geometry of the inlet or outlet systems of the engine is undertaken in the case of a drive slip control.

12 Claims, 3 Drawing Sheets

METHOD AND ARRANGEMENT FOR CONTROLLING AN INTERNAL COMBUSTION ENGINE

BACKGROUND OF THE INVENTION

A method and an arrangement for controlling an internal combustion engine is disclosed in U.S. patent application Ser. No. 08/157,993, filed Nov. 26, 1993, now U.S. Pat. No. 5,558,178. Here, in the context of a drive slip control (ASR), a desired torque to be outputted by the engine is pregiven and the slip at the drive wheels is caused to approximate a pregiven value with the aid of this desired torque. The desired torque is made available by at least one of the following: a torque-controlling intervention in the fuel metering, the ignition and/or the air supply to the engine. The intervention in the metering of fuel occurs by interrupting the supply of fuel to a pregiven number of selected cylinders, that is, by switching cylinders off or by cylinder blanking.

The running quality of the internal combustion engine is affected by the interruption of fuel to one or more cylinders as well as by the shifting of the ignition. This influence on the running quality is accepted often in the known system even for small control interventions, that is, even for small changes in torque.

SUMMARY OF THE INVENTION

In view of the above, it is an object of the invention to provide a method and an arrangement for controlling an internal combustion engine wherein the running quality of the engine is improved when the engine torque is reduced by injection suppression and/or by ignition shifting in the context of a drive slip control.

The method of the invention is for controlling an internal combustion engine equipped with means for changing the adjustment of the inlet and outlet valves of the engine and/or with means for changing the geometry of the air-intake system and/or of the exhaust-gas system. The method includes the step of adjusting at least any one of the inlet and outlet valves, the geometry of the air-intake system and the geometry of the exhaust-gas system to reduce the torque of the engine in the drive slip control mode of operation.

To increase the power of an internal combustion engine, often measures are executed which, at least in operating ranges having high power requirements, influence the geometry of the air-intake system and/or of the exhaust-gas system and/or the control times of the inlet and outlet valves of the engine.

Thus, German patent publication 3,608,310 discloses an arrangement for changing the length of the air-intake pipe of an internal combustion engine. The power of the engine can be increased at full load by changing the length of the air-intake pipe. In addition to this change of the geometry of the air-intake system, also changes of the geometry of the exhaust-gas system of the engine are known. A noise-optimized exhaust system geometry for city traffic and a power-optimized exhaust system geometry for highway driving are provided by flaps in two separate exhaust channels. In addition, flaps are known which change the geometry of the air-intake system to increase resonance effects and therefore increase power.

U.S. Pat. No. 4,856,465 discloses an arrangement for displacing the camshaft of the engine to control the inlet and outlet valves of the engine in dependence upon operating states. The valve overlap times are adjusted in dependence upon rpm and load and, in the lower to mid part-load range, consumption is reduced and exhaust-gas emissions are improved. In the full-load range, a power increase of the engine is obtained.

The invention affords the advantage that a reduction of the engine torque to reduce the slip at the drive wheels can be executed without affecting comfort and without affecting the running quality.

The invention is in combination with an engine control system wherein individual or several injections are suppressed or the ignition is shifted for drive slip control. In combination with such an engine control system, it is especially advantageous when the procedure provided by the invention is first utilized to reduce torque and only then injections are suppressed and the ignition is shifted when there is a further requirement for torque reduction.

In combination with engines having variable camshaft adjustment, it is advantageous when, in the case of drive slip control, the camshaft position is switched or controlled to low power in the full-load range and, in the part-load range, the camshaft position is switched or controlled so that there are small quantities of residual exhaust gas. The last situation leads to a reduction of the residual exhaust gas and to an improvement of again activating cylinders which may have been suppressed to facilitate drive slip control.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
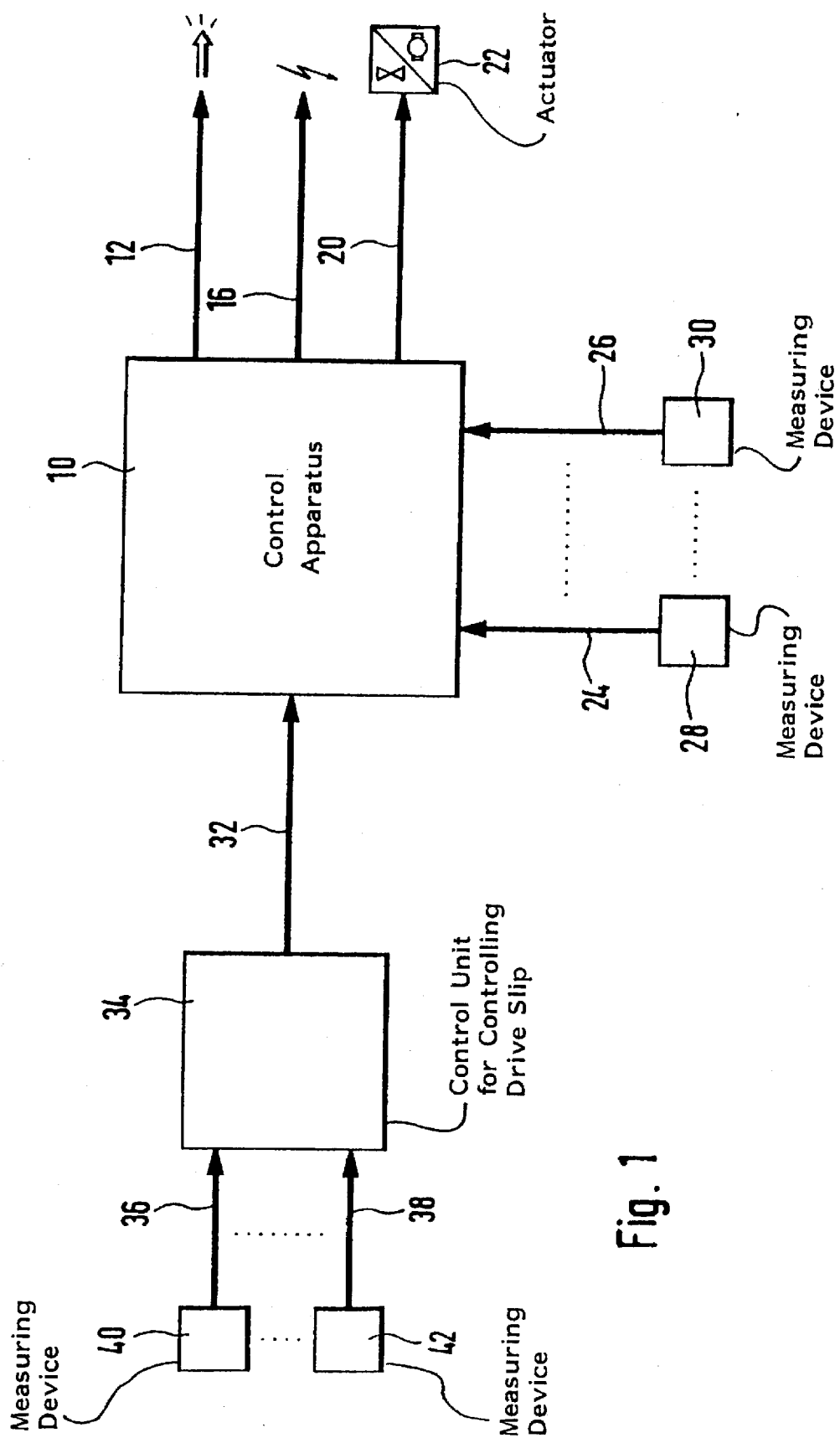
FIG. 1 is an overview block circuit diagram for controlling an internal combustion engine.

In the control system shown in FIG. 1, reference numeral 10 identifies a control apparatus for controlling an internal combustion engine. The control apparatus 10 includes an output line 12 for controlling the fuel metering and an output line 16 for controlling the ignition time point or ignition angle. In addition, one or more actuators 22 are driven via one or more output lines 20 for changing the geometry of the air-intake system and/or the exhaust-gas system and/or for controlling the opening times of the inlet and/or outlet valves or for controlling the camshaft. Measuring devices 28 to 30 are connected to the control apparatus 10 via input lines 24 to 26, respectively. The measuring devices 28 to 30 detect operating variables of the engine or of the motor vehicle which are used to control the engine. Input line 32 connects the control apparatus 10 to a control unit 34 for controlling the drive slip. Measuring devices 40 to 42 provide signals with respect to the rpm of the wheels of the motor vehicle and are connected to the control unit 34 via input lines 36 to 38, respectively.

The control system shown in FIG. 1 operates in the preferred embodiment as shown in the state of the art referred to initially herein. The control unit 34 determines the tendency of at least one drive wheel to slip from the wheel rpm signal supplied thereto. If the wheel rpm of this at least one drive wheel increases beyond a pregiven reference value, then the control unit 34 outputs a signal via the line 32 to the control apparatus 10 which reduces the torque of the engine. The signal adjusts the slippage determined from the wheel rpms to a pregiven desired value. In the preferred embodiment, the transmitted signal defines a desired value for the torque to be outputted by the engine and can, in other embodiments, be desired quantities to adjust the metering of fuel via suppression of individual injection pulses and/or desired values for adjusting the ignition.

The control apparatus 10, in a known manner, carries out the metering of fuel, adjustment of ignition as well as one or more power increasing measures such as adjusting the camshaft, control of the inlet and outlet valves, changing the geometry of the air-intake system and/or exhaust system. The metering of fuel is determined on the basis of a preprogrammed characteristic field in dependence upon engine rpm and engine load. Likewise, the adjustment of the ignition time point is carried out.

The engine can be provided with a variable camshaft adjustment or the opening times of the inlet and outlet valves of the engine can be controlled. If this is the case, then this is undertaken on the basis of a preprogrammed characteristic field in dependence upon engine rpm, engine load and, if required, motor vehicle acceleration or changes in load. The electromagnetic valve 22 adjusts the camshaft and is driven in such a manner that a clear reduction in consumption and an improvement of running takes place in idle and in the lower to mid part-load range, while an increase of power of the engine occurs in the upper part-load and full-load ranges.

In another embodiment, a continuous adjustment of the camshaft takes place in the context of a position control loop. By means of a suitable control of the camshaft adjustment, the exhaust-gas emissions are optimized in the lower and mid part-load ranges and the residual portion of exhaust gas remaining in the cylinder after a combustion is reduced. The function of the variable camshaft adjustment is modified in accordance with the invention in the drive slip control mode in such a manner that the camshaft is displaced to reduce torque when there is an intervention to control the drive slip. This has special advantages when the driver accelerates the vehicle rapidly. In this operating state, a transfer is made to a camshaft position which provides a clear reduction of power of the engine. This is in lieu of the rpm-load characteristic field for adjusting the camshaft. The above takes place by adjusting the camshaft to the lowest power or a pregiven end position in a special rpm-load characteristic field. Distinguishing the full-load range and the part-load range is especially advantageous in this context. In the part-load range, a camshaft position is adjusted, for example, by inputting: a special rpm-load point, a special rpm-load characteristic field determined experimentally to the lowest portion of residual exhaust gas or a special position desired value to reduce the portion of residual exhaust gas and, in the full-load range, a position for the greatest possible reduction in power.

In the same way, a change of the geometry of the air-intake or exhaust-gas system is influenced in the drive slip control mode.

In a preferred embodiment, wherein a necessary torque reduction takes place, the control unit 34 adjusts the camshaft or the intake system or exhaust system geometry for reducing power and only then is there an intervention in the metering of fuel and/or in the ignition. A parallel intervention is likewise possible.

In a preferred embodiment for the ASR-control mode, an intervention is made in the metering of fuel and ignition to control the slip to a pregiven desired value in dependence upon the difference between desired torque and actual torque which remains after influencing the camshaft and/or geometry.

In another advantageous embodiment, the camshaft and/or the geometry of the intake and exhaust channels are influenced on the basis of experimentally determined characteristic fields in dependence upon rpm, load and the difference between the desired and actual torques in such a manner that the difference is just compensated for, at least for small differences, by acting on the camshaft and/or the geometry.

Figure 2:
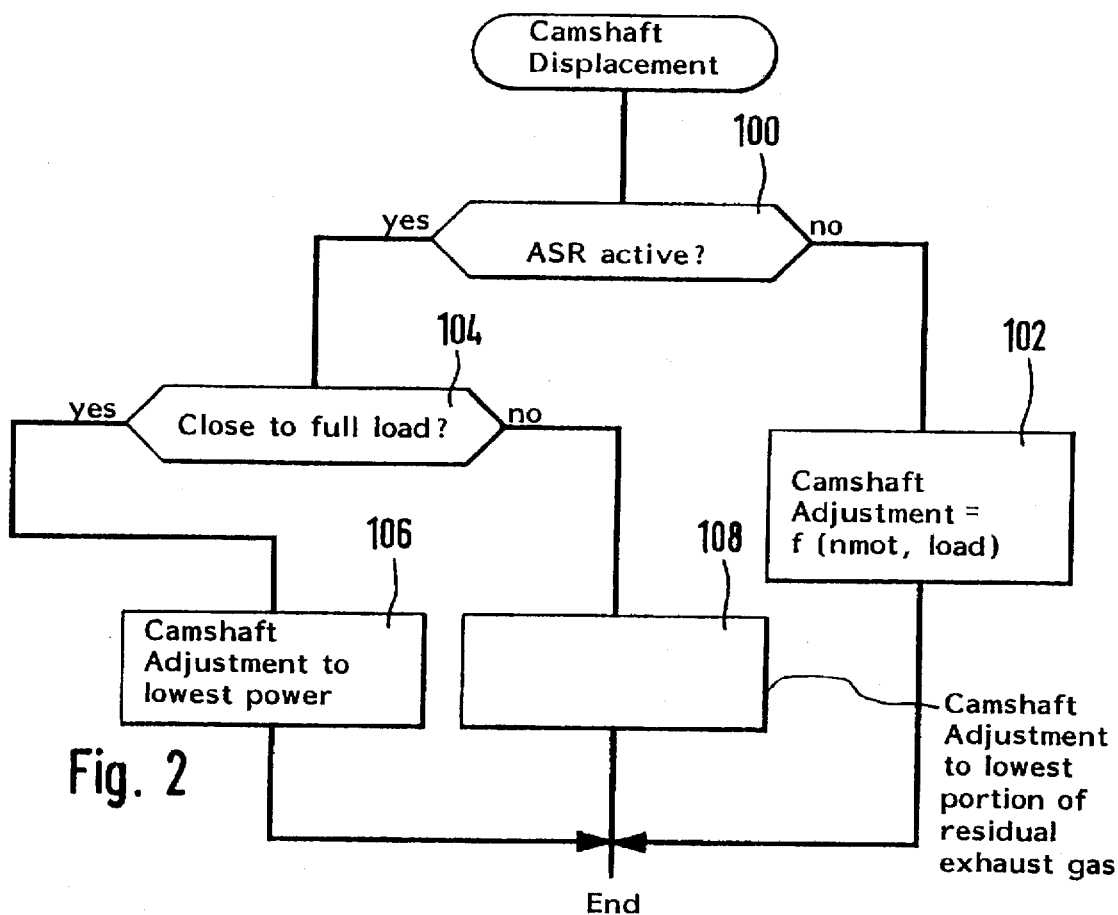
FIG. 2 is a flowchart showing an embodiment of the method of the invention in the context of a variable camshaft adjustment.

FIG. 2 shows a preferred embodiment for influencing the displacement of the camshaft in drive slip control operation.

After the start of the subprogram shown in FIG. 2, a check is made in inquiry step 100 at pregiven time points or camshaft angles as to whether the drive slip control is active. This is preferably realized by means of a mark which is set at the beginning of a drive slip control. If this is not the case, then, in step 102, the position of the camshaft is determined from a pregiven characteristic field in dependence upon engine rpm and engine load or in the context of a position control loop operating on the basis of a desired value determined in dependence upon at least engine rpm and engine load. The subprogram is then ended.

If the drive slip control is active, then a check is made in inquiry step 104 as to whether the operating state of the internal combustion engine is in the upper load range. This check is performed on the basis of a load threshold value which delimits the range of the upper part-load range and of the full-load range from the ranges of the lower and middle part load. Engine rpm and/or throttle flap position are other criteria which can be considered. The full-load range can, for example, be assumed for a throttle flap position of greater than 75% of the total position range of 100% or, for engine speed greater than 4,000 rpm. If the engine is in the full-load range, then a reduction of engine power is undertaken by adjusting the camshaft in the sense of reducing power in that, for example, the camshaft position is adjusted at idle while precluding the characteristic field evaluated in step 102 or by inputting the idle desired value of the position control loop or by utilizing a special characteristic field for lowest power. If the internal combustion engine is not in the full-load range but is instead in the lower and middle part-load ranges then, in lieu of step 106, the camshaft adjustment is undertaken in step 108 in such a manner that the lowest small residual exhaust-gas portion occurs. Here too, either a position of the camshaft is adjusted in which the residual exhaust-gas portion is reduced or, the adjustment is made via a special characteristic field with a low residual exhaust-gas portion. The program is ended after steps 106 to 108 and repeated at pregiven time points.

Figure 3:
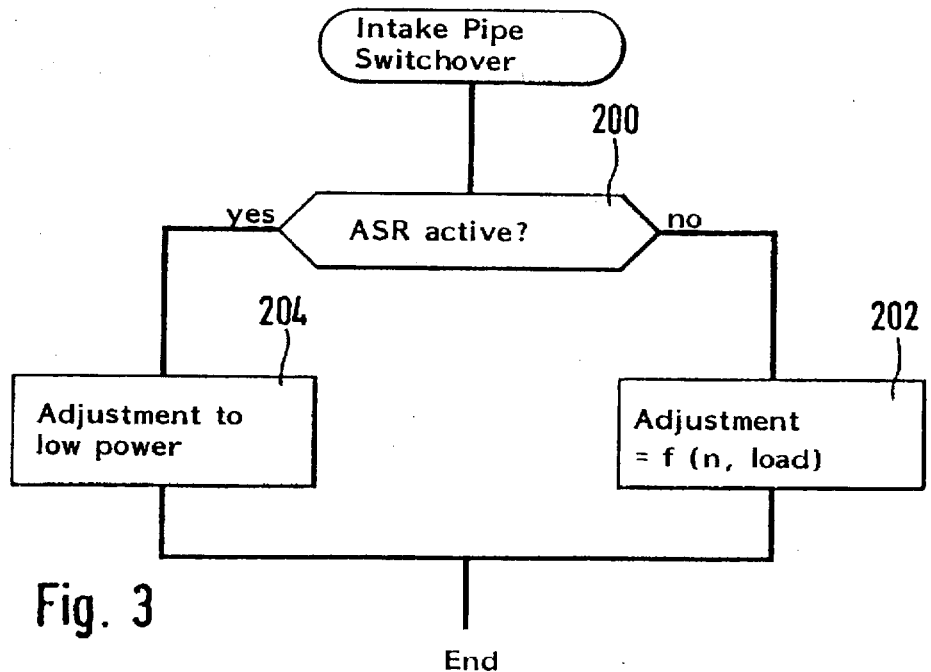
FIG. 3 is a flowchart showing another embodiment of the invention wherein an intake pipe switchover takes place; and, FIG. 4 is a flowchart which shows the invention as part of a drive slip control system equipped with injection suppression and/or ignition intervention.

In FIG. 3, the procedure according to the invention is undertaken in combination with an intake pipe switchover. Here too, a check is made in the first step 200 as to whether the drive slip control is active. If this is not the case, then, according to step 202, the adjustment of the intake pipe geometry is made on the basis of the predetermined engine-rpm engine-load characteristic field; whereas, for an active drive slip control, an adjustment is made to low engine power, for example, to the intake geometry present in the idle state.

Figure 4:
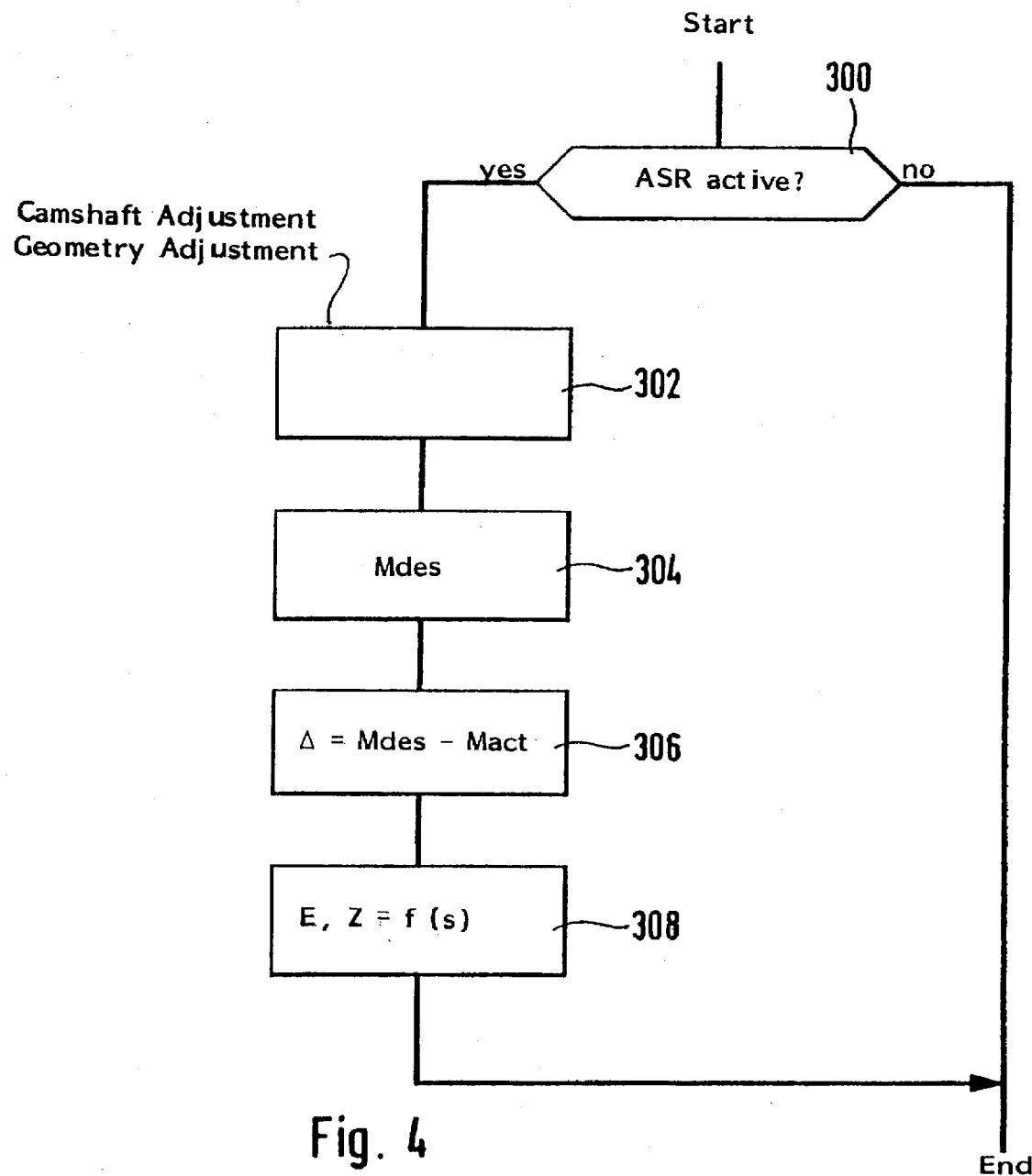

If the reduction in torque via the above-given measures for controlling the slippage to a desired slip is not adequate, then, via the given measures in a third embodiment of the invention, a reduction in torque is undertaken by suppression of individual injections and/or shifting the ignition. This is shown in the flowchart of FIG. 4.

After the start of the subprogram, an inquiry is made in a first step 300 as to whether an ASR-intervention is present. If this is the case, then, in step 302, the camshaft position is changed and/or the geometry is adjusted in accordance with the invention. Thereafter, in step 304, the desired torque is read in and, in step 306, the desired torque is compared to the actual torque and the difference is formed. Thereafter, in step 308, the number of cylinders which are to be deactivated and/or the correction of the ignition adjustment is determined and outputted. Thereafter, the subprogram is ended and repeated at a pregiven time.

The described action on the power increasing measures in the ASR mode are undertaken in dependence upon peripheral conditions individually or in any desired combination. Here, it is to be noted that, in a like manner, a power reduction adjustment of possibly present resonance flaps and/or flaps in the exhaust system of the engine is undertaken.

In addition to the described embodiment in the context of a drive slip control system, this embodiment is successfully used for reducing torque in combination with a rpm and/or road speed limitation with cylinder cutoff and/or in combination with a cylinder cutoff for the fuel cutoff in overrun operation.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine having an air-intake channel and an output channel and being equipped with at least one of an air-intake switchover to change the resonance geometry of the air-intake channel and means for changing the resonance geometry of the output channel, the method comprising the steps of:
   increasing the power of the engine in predetermined operating states of said engine by changing the geometry of at least one of said channels; and,
   in the case of drive slip control, causing at least one of said air-intake switchover and said means to be adjusted to low power resonance.

2. A method of controlling an internal combustion engine having inlet and outlet valves and an air-intake channel and an output channel and being equipped with the following: first means for controlling said inlet and outlet valves; second means for changing the geometry of said intake channel; and, third means for changing the geometry of said output channel; the method comprising the steps of:
   controlling one of said first, second and third means to reduce the power of said engine when a reduction in torque is required;
   providing a desired value (Mdes) for said torque;
   forming an actual value (Mact) for said torque;
   forming the difference (Δ) between said desired value (Mdes) and said actual value (Mact); and,
   determining and outputting at least one of the following quantities in dependence upon said difference (Δ):
   a correction to shift the ignition angle; and,
   a number of individual ones of the cylinders of said engine to which the metering of fuel is interrupted.

3. The method of claim 2, wherein an adjustment of the inlet and outlet valves is made to provide the least engine power in the drive slip control mode.

4. The method of claim 2, the adjustment to provide the least engine power is made in the full-load range and in close proximity thereto.

5. The method of claim 2, wherein the adjustment of said inlet and outlet valves is made in the low and mid part-load range to obtain a small portion of residual exhaust gas.

6. The method of claim 2, wherein a variable camshaft displacement dependent upon engine rpm and engine load is provided for adjusting the inlet and outlet valves.

7. The method of claim 2, wherein an air-intake switchover is provided to change the geometry of the air-intake channel and the air-intake switchover is adjusted to low power in the drive slip control mode.

8. The method of claim 7, wherein an adjustment of the camshaft displacement or of the air-intake switchover is made immediately to reduce the engine torque when the drive slip control mode occurs.

9. The method of claim 8, wherein the torque reducing adjustment is first made at the start of the drive slip control mode; and, thereafter, performing at least one of the following steps: acting on the ignition, suppressing individual injections and acting on ignition and suppressing individual injections simultaneously.

10. The method of claim 2, wherein, when there are rpm and road-speed limits, to reduce torque, an adjustment of the inlet and outlet valves or of the geometry of the air-intake channel or of the output channel is made by doing at least one of the following: suppressing individual injections and suppressing individual injections in combination with cutting off the metering of fuel in overrun operation.

11. An arrangement for controlling an internal combustion engine having an air-intake channel and an output channel, the arrangement comprising:
   at least one of an air-intake switchover to change the resonance geometry of the air-intake channel and means for changing the resonance geometry of the output channel to increase the power of the engine in predetermined operating states of the engine; and,
   means for operating on said at least one of said air-intake switchover and said means to adjust the power of said engine to low power in the case of drive slip control.

12. An arrangement for controlling an internal combustion engine having inlet and outlet valves and an air-intake channel and an output channel, the arrangement comprising:
   first means for controlling said inlet and outlet valves;
   second means for changing the geometry of said air-intake channel;
   third means for changing the geometry of said outlet channel;
   a control apparatus for driving at least one of said first, second and third means for reducing the power of the engine when a reduction in torque is required;
   means for inputting a desired value (Mdes) for the torque of said engine;
   means for forming an actual value (Mact) for said torque; means for forming the difference (Δ) between said desired value (Mdes) and said actual value (Mact);
   means for determining and outputting at least one of the following quantities in dependence upon said difference (Δ):
   a correction to shift the ignition angle; and,
   a number of individual ones of the cylinders of said engine to which the metering of fuel is interrupted.

* * * * *